US008317251B2

(12) United States Patent  
Nelson

(10) Patent No.: US 8,317,251 B2  
(45) Date of Patent: Nov. 27, 2012

(54) REMOVABLE ENCLOSURE FOR REAR OF VEHICLE

(76) Inventor: Charles R. Nelson, La Pointe, WI (US)

( * ) Notice: Subject to any disclaimer, the term of this patent is extended or adjusted under 35 U.S.C. 154(b) by 310 days.

(21) Appl. No.: 12/662,687

(22) Filed: Apr. 28, 2010

(65) Prior Publication Data

US 2010/0276964 A1    Nov. 4, 2010

Related U.S. Application Data

(60) Provisional application No. 61/335,326, filed on Jan. 4, 2010, provisional application No. 61/283,237, filed on Nov. 30, 2009, provisional application No. 61/217,216, filed on May 27, 2009, provisional application No. 61/215,669, filed on May 8, 2009, provisional application No. 61/215,059, filed on May 1, 2009.

(51) Int. Cl.  
*B60P 3/345* (2006.01)  
*E04H 15/06* (2006.01)

(52) U.S. Cl. .................. 296/26.02; 296/26.08; 224/403; 135/88.13

(58) Field of Classification Search .................. 224/400, 224/402, 403, 404, 488, 539; 296/26.01, 296/26.02, 26.03, 26.08, 100.18; 135/88.05, 135/88.13, 88.15  
See application file for complete search history.

(56) References Cited

U.S. PATENT DOCUMENTS

| 3,082,033 | A |  | 3/1963 | Bosher |  |
|---|---|---|---|---|---|
| 4,088,363 | A |  | 5/1978 | Palmer |  |
| 4,652,040 | A |  | 3/1987 | Mahan |  |
| 4,907,728 | A | * | 3/1990 | Giblet | 224/585 |
| 5,335,960 | A |  | 8/1994 | Benignu, Jr. |  |
| 5,358,298 | A |  | 10/1994 | Fate |  |
| 5,419,607 | A |  | 5/1995 | Oliveira |  |
| 5,676,414 | A |  | 10/1997 | Hammond |  |
| 5,806,906 | A |  | 9/1998 | Hammond |  |
| 5,887,932 | A |  | 3/1999 | Pier, II |  |
| 5,908,043 | A | * | 6/1999 | Paes et al. | 135/139 |
| 5,924,611 | A | * | 7/1999 | Mizuno | 224/42.4 |
| 6,155,279 | A |  | 12/2000 | Humphrey |  |
| D461,759 | S |  | 8/2002 | Napieraj |  |
| 6,481,784 | B2 |  | 11/2002 | Cargill |  |
| 6,609,743 | B1 | * | 8/2003 | Stevenson | 296/26.11 |
| 6,648,391 | B1 | * | 11/2003 | Whiteford et al. | 296/26.08 |
| 6,725,807 | B1 |  | 4/2004 | Tapia |  |
| 6,802,327 | B2 |  | 10/2004 | Koss |  |
| 7,396,064 | B2 | * | 7/2008 | Hicks | 296/26.01 |
| 2003/0029487 | A1 |  | 2/2003 | Kight |  |
| 2003/0066550 | A1 | * | 4/2003 | Al-Ghamdi | 135/121 |

FOREIGN PATENT DOCUMENTS

CA    2 304 359 A1    10/2001  
FR    2366775 A    4/1978  
* cited by examiner

*Primary Examiner* — Justin Larson  
(74) *Attorney, Agent, or Firm* — Richard C. Litman

(57) ABSTRACT

The removable enclosure for the rear of a vehicle provides additional storage space or cover for the open rear end of a vehicle, such as an open tailgate of a pickup truck or the open hatch of an SUV. The removable enclosure includes a housing having at least one sidewall and an upper wall defining an open lower end and an open front end. An internal frame is disposed within and supports the housing. The internal frame includes at least one elastic cord extending laterally across the housing. A pair of laterally opposed diagonal supports each extend from an upper edge of the front end of the housing to a lower edge of a rear face of the at least one sidewall. The at least one elastic cord is secured to, and extends between, the pair of laterally opposed diagonal supports.

20 Claims, 15 Drawing Sheets

REMOVABLE ENCLOSURE FOR REAR OF VEHICLE

CROSS-REFERENCE TO RELATED APPLICATION

This application claims the benefit of U.S. Provisional Patent Application Ser. No. 61/335,326, filed Jan. 4, 2010; Ser. No. 61/283,237, filed Nov. 30, 2009; Ser. No. 61/217,216, filed May 27, 2009; Ser. No. 61/215,669, filed May 8, 2009; and 61/215,059, filed May 1, 2009.

BACKGROUND OF THE INVENTION

1. Field of the Invention

The present invention relates to vehicle accessories and to portable enclosures, and particularly to a removable enclosure for the rear of a vehicle that provides additional storage space or cover for the open rear end of a vehicle, such as an open tailgate of a pickup truck, the open hatch of a sports utility vehicle or the like.

2. Description of the Related Art

Although enclosures for the bed of a pickup truck and the like are known, most such enclosures, particularly those adapted for providing temporary shelter while camping, are heavy rigid structures that are semi-permanently attached to the cargo box of the pickup truck. Thus, conversion between normal usage of the truck for transport of loads and the like and the shelter is inconvenient to the user. Such structures are also difficult to separately transport and store. Collapsible, rigid enclosures (i.e., so-called "pop-up" campers) have been provided that include rigid panels that fold into a relatively low profile for travel, and then unfold or pop up to form a camping enclosure. However, such rigid enclosures are extremely heavy, difficult to install on a pickup truck, difficult to remove from a pickup truck, and are relatively expensive.

There are numerous accessories that are especially adapted for use with a standard pickup truck, with the most common including bed liners, caps, tonneau covers, utility enclosures and camper bodies. The utility enclosure and the camper body involve structures that are intended to fit into the bed of the vehicle between the wheel wells, and provide access to the interior thereof via a door or doors at the rear end. The vehicle operator can enter the enclosure or camper body to obtain equipment or to eat or sleep as is necessary.

A camper body can be outfitted with all of the amenities of home, just like a travel trailer, although the interior is rather cramped and is best suited to one or two occupants at a time. A camper body is very heavy and a great deal of care must be exercised if one wants to remove the body from the bed of the truck so that the truck can be put to other uses. Similarly, a utility enclosure is quite heavy, and once it is inserted into the bed, it is likely that it will not be removed therefrom without there being a specific need to use the truck with its bed exposed. A utility enclosure is, in essence, a larger version of a truck cap, and it will usually be filled with tools and other equipment.

Soft enclosures, such as tents, that are mountable in the cargo box of a pickup truck have also been provided. Typically, these tents are limited in size to the length of the cargo box when the tailgate is in the vertical, or closed, position. Other tents have been provided that are partially attached to the cargo box and are partially attached to the ground. Such tents are quite complex and require a substantial amount of time and effort to erect. Moreover, these tents tend to become quite hot in direct sunlight and do not provide adequate shelter from rain and wind. Further, these tents do not provide adequate storage space.

There are numerous different types and styles of conventional campers. Examples of campers include the shell-style camper, which rests upon rear sidewalls of a pickup truck; the hard-walled camper which fits within the bed of a pickup truck; and flexible-walled camper systems, which utilize a tent or tent-like covering mounted upon a frame attached to the truck.

Conventional flexible walled camper units generally include a frame portion and a tent covering portion. The frame portion generally corresponds to a conventional tent frame, with tent pole members attached to the truck and generally oriented over the pickup truck bed. The tent covering may be of canvas, nylon, or similar material, and generally is spread over the tent frame to enclose the camper and truck bed.

Such conventional camper units are typically mounted in trucks, such as pickup trucks, which have a rear tailgate member that can be lowered to a position flush with the bed of the truck. Thus, the tailgate may be used to effectively extend the length of the bed beyond a rear bumper portion of the truck.

With conventional tent camper arrangements, there have been some problems with accommodating the tailgate. In some arrangements, the tailgate cannot be enclosed within the tent camper, so the ability of the tailgate to extend the length of the bed to make for more room is not utilized. In arrangements where the tailgate is enclosed within the tent, a complex frame system may be required and/or special attachment means mounted on the tailgate may be necessary in order to provide for secure engagement between the tent covering and the tailgate. Such systems may be relatively expensive, difficult to assemble or disassemble, may require special modifications to the truck, truck frame or body, and may be unattractive.

Another problem with such systems has been the general failure to provide an appropriate anchor point for securing the tent covering and frame. For a conventional tent mounted upon the ground, generally stakes and laterally extending lines, often referred to as guy-lines, are used to maintain tension on the frame of the tent, by placing tension on the tent covering or poles, to support the tent frame in an upright position and maintain same against strong winds or the like.

In conventional tent camper arrangements mounted upon truck beds, however, generally such guy-lines and stakes are undesired as they inhibit the ability to move the vehicle, even slightly, with the camper erected and, further, they prevent the camper unit from being used over hard surfaces, such as pavement, asphalt or firmly graded ground, where the driving of stakes would be difficult if not impossible. Generally, in the past, this has necessitated the development of complex frame systems, for use with such trucks, which are free standing in that they do not use guy-lines either attached directly to the frame or on the tent covering over the frame, for secure erection. Even conventional tent camper systems that have enclosed the tailgate therein have generally failed to utilize the tailgate as a laterally extended anchor point serving as a substitute for a guy-line and stake.

Devices that are secured to the rearward portion of motor vehicles for the purpose of recreational camping within the vehicles are known. However, such devices are typically difficult to transport and store, provide less than adequate protection from adverse weather conditions, are not easily installed on the vehicle, and require both modifications and additions to the vehicle. Additionally, such systems are not well adapted for multiple uses. For example, a tent designed for connection to a pickup truck typically is designed for single-person usage in a single environment, and could not be easily adapted to, for example, ice fishing or for providing protection for a dog. Additionally, such systems do not provide multiple functionality, being used for both storage and as an enclosure.

Thus, a removable enclosure for the rear of a vehicle solving the aforementioned problems is desired.

SUMMARY OF THE INVENTION

The removable enclosure for the rear of a vehicle provides additional storage space or cover for the open rear end of a vehicle, such as an open tailgate of a pickup truck, the open hatch of a sports utility vehicle or the like. The removable enclosure includes a housing having at least one sidewall and an upper wall, the housing having an open lower end and an open front end. Preferably, a flap is formed in the upper wall of the housing. The housing may be formed from any suitable type of waterproof material, such as that commonly used in the manufacture of tents, tarps and the like. At least one storage pocket is preferably formed on an inner face of the flap. Additionally, a slit may be formed through the at least one sidewall of the housing. The flap and slit may be releasably sealed by any suitable type of releasable fastener, such as zippers or the like.

An internal frame is disposed within and supports the housing. The internal frame includes at least one elastic cord extending laterally across the housing, the cord being secured to an inner surface thereof. A pair of laterally opposed diagonal supports each extend from an upper edge of the front end of the housing to a lower edge of a rear face of the housing. The elastic cord is secured to and extends between the pair of laterally opposed diagonal supports.

A laterally extending resilient member, which is formed from foam or the like, may be mounted on a front, upper portion of the internal frame. This allows the front, upper portion of the housing to be angled upwardly, the upper portion being substantially triangular. When applied to the open tailgate of a pickup truck, the housing may be used with the cover of the pickup truck's bed in place, the front end of the housing being disposed between the laterally opposed walls defining the bed and the upper edge of the triangular portion of the upper wall of the housing contacting a lower surface of the cover, and providing a seal therebetween.

Any suitable type of releasable fastener may be used to secure the open front end and the open lower end of the housing to the open rear end of the vehicle. For example, at least one pair of hook members may be respectively attached to laterally opposed ends of the elastic cord. The hook members engage a pair of brackets mounted within the rear end of the vehicle to releasably secure the housing to the rear end of the vehicle.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
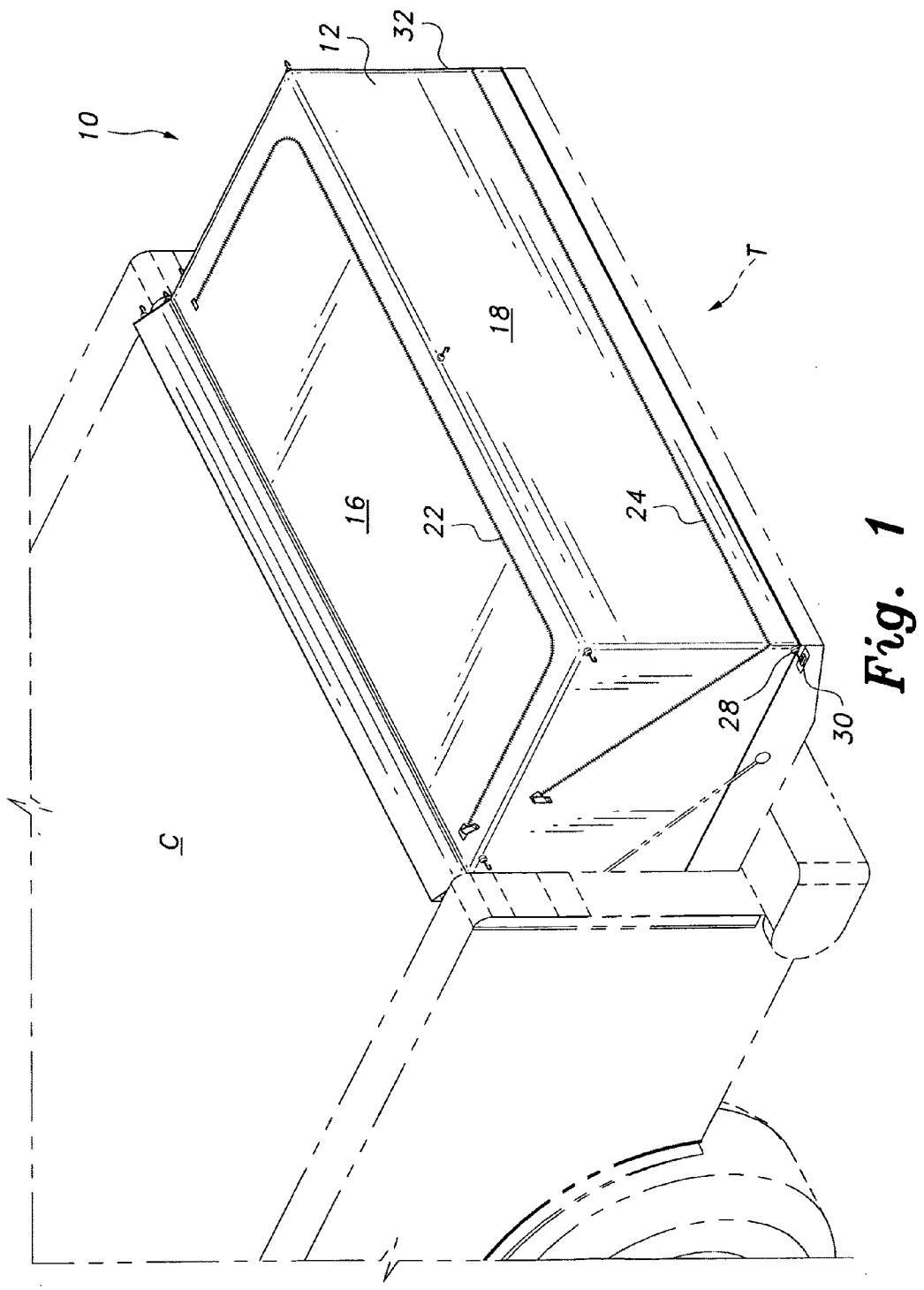
FIG. 1 is an environmental, perspective view of a first embodiment of a removable enclosure for the rear of a vehicle according to the present invention.
Figure 2:
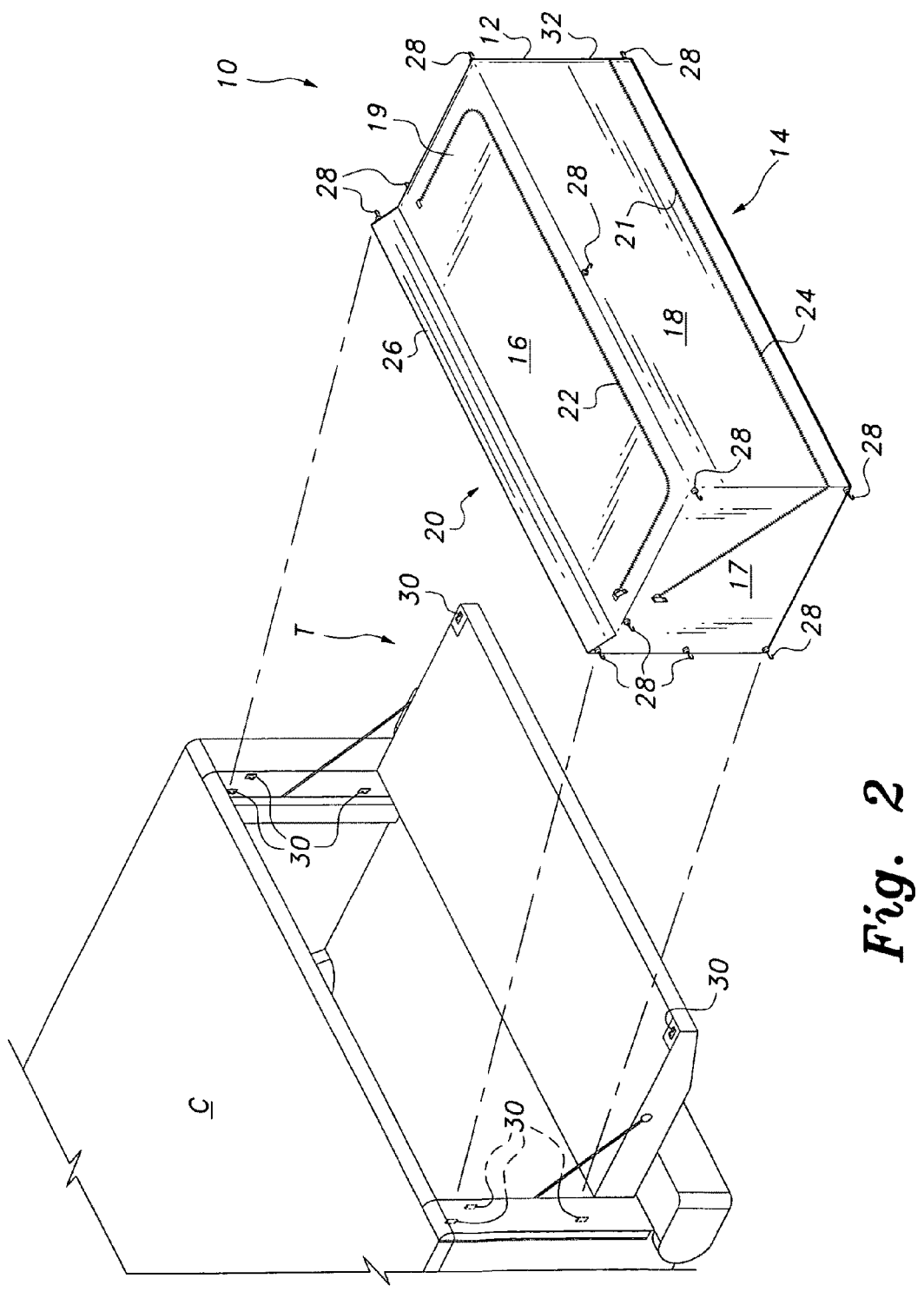
FIG. 2 is a perspective view of the removable enclosure of FIG. 1.

As best shown in FIGS. 1 and 2, in a first embodiment, the removable enclosure for the rear of a vehicle 10 provides additional storage space or cover for the open rear end of a vehicle, such as an open tailgate T of a pickup truck, the open hatch of a sports utility vehicle or the like. It should be understood that the tailgate T of the pickup truck shown in FIGS. 1 and 2 is shown for exemplary purposes only, and that the enclosure 10 may be applied to the open rear end of any suitable type of vehicle.

The removable enclosure 10 includes a housing having at least one sidewall 12 and an upper wall 16, the lower end and the front end 20 of the housing both being open. Hereinafter, the terms "front" and "rear" will refer to the orientation of enclosure 10 illustrated in FIGS. 1 and 2 in reference to the vehicle; i.e., the front end 20 of the housing 32 faces the open rear end of the vehicle and the rear face 18 of the housing faces away from the open rear end of the vehicle. In other words, the terms "rear" and "front" are used relative to the rear and front of the vehicle. In the example of FIGS. 1 and 2, the front end 20 of the housing extends into the body of the vehicle (i.e., into the truck bed, supported by the lowered tailgate T) by approximately ten inches.

Figure 6:
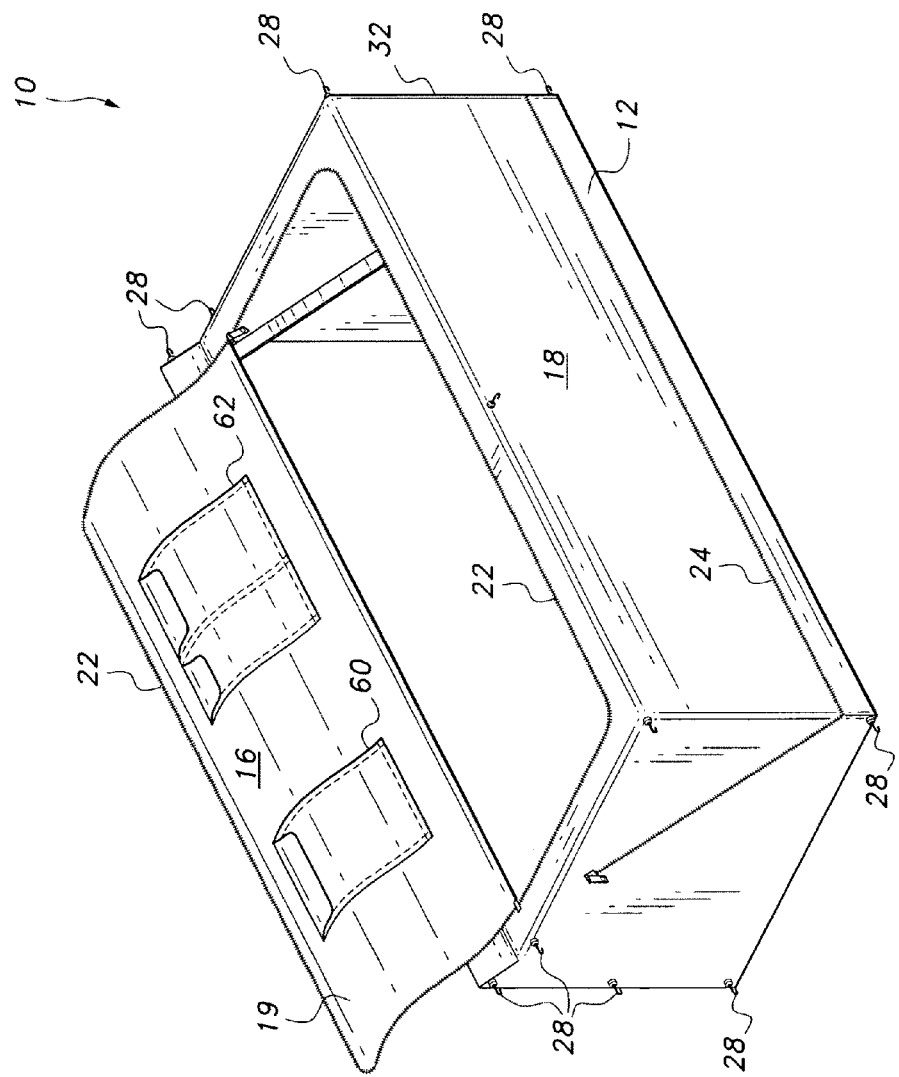
FIG. 6 is a perspective view of the removable enclosure of FIG. 1, shown in a partially opened configuration.

As shown, the housing preferably has a substantially rectangular cross sectional, with a pair of laterally opposed, substantially rectangular walls 17, and a substantially rectangular rear face 18 defining the open front end 20 and the open lower end, which are also preferably substantially rectangular. As best shown in FIGS. 2 and 6, a flap 19 is formed in the upper wall 16 of the housing. The housing may be formed from any suitable type of waterproof material, such as that commonly used in the manufacture of tents, tarps and the like. At least one storage pocket is disposed on the inner face of the flap 19. In the example of FIG. 6, a single storage pocket 60 and a double-chambered storage pocket 62 are shown fixed to the inner face of flap 19. It should be understood that the number, orientation, position, configuration, and dimensions of the pockets may be varied, depending upon the needs of the user. The pockets may be formed from mesh, canvas or the like, and may be particularly adapted for containing flashlights, batteries, or any other desired accessories.

Additionally, a slit 21 may be formed through the at least one sidewall 12 of the housing 32. As best shown in FIG. 2, the slit 21 may extend from the front, upper edges of the laterally opposed walls 17 to the rear, lower edges thereof, and extend laterally across the lower end of the rear face 18. The flap 19 and slit the 21 may be releasably sealed by any suitable type of releasable fastener, such as zippers 22, 24 or the like. Both the flap 19 and the slit 21 allow for easy loading and unloading of materials from the truck's bed when the enclosure 10 is in place.

Figure 3:
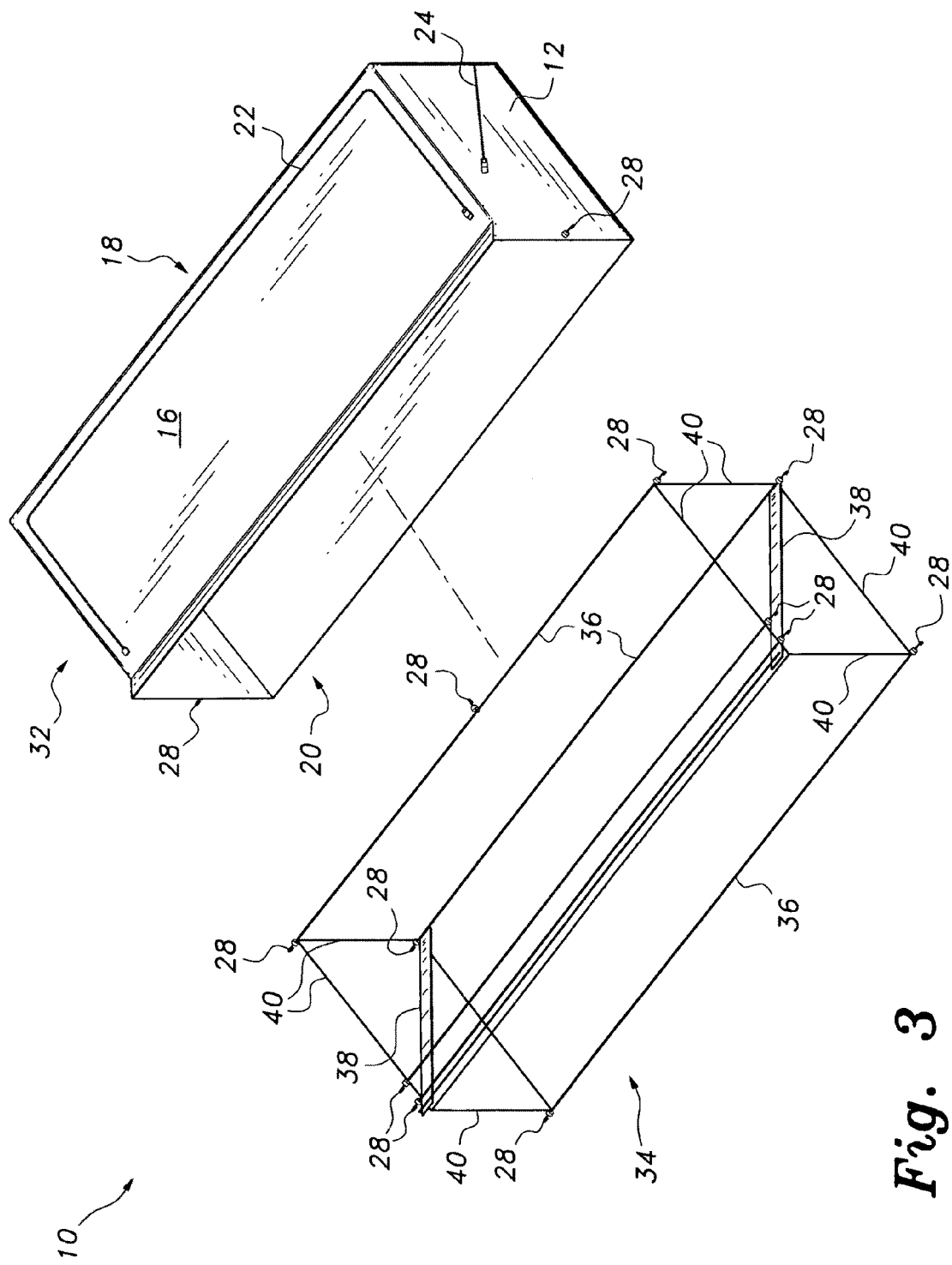
FIG. 3 is a partially exploded perspective view of the removable enclosure of FIG. 1.

As shown in FIG. 3, an internal frame is disposed within and supports the housing 32. The internal frame includes at least one elastic cord 36 extending laterally across the frame. As shown in FIG. 3, preferably, a plurality of elastic cords 36 are provided. A pair of laterally opposed diagonal supports 38 each extend from an upper edge of the front end of the frame to a lower edge of the rear of the frame. The elastic cords 36 extend between the pair of laterally opposed diagonal supports 38. Preferably, the diagonal supports 38 are formed from a firm, yet flexible, material. Additional side supports or rods 40 may also be added, allowing for the rectangular shape of the frame, as shown in FIG. 3. These additional supports allow the user to adjust the overall shape of the frame. For example, the upper, rearmost elastic cord 36, shown in FIG. 3, may be collapsed against the diagonal supports 38, allowing the overall configuration of the enclosure 10 to be changed from a substantially rectangular enclosure to a substantially triangular enclosure. Side supports 40 may be formed from fiberglass rods or the like, allowing them to be easily bent, yet provide strong support for the housing 32.

Figure 7:
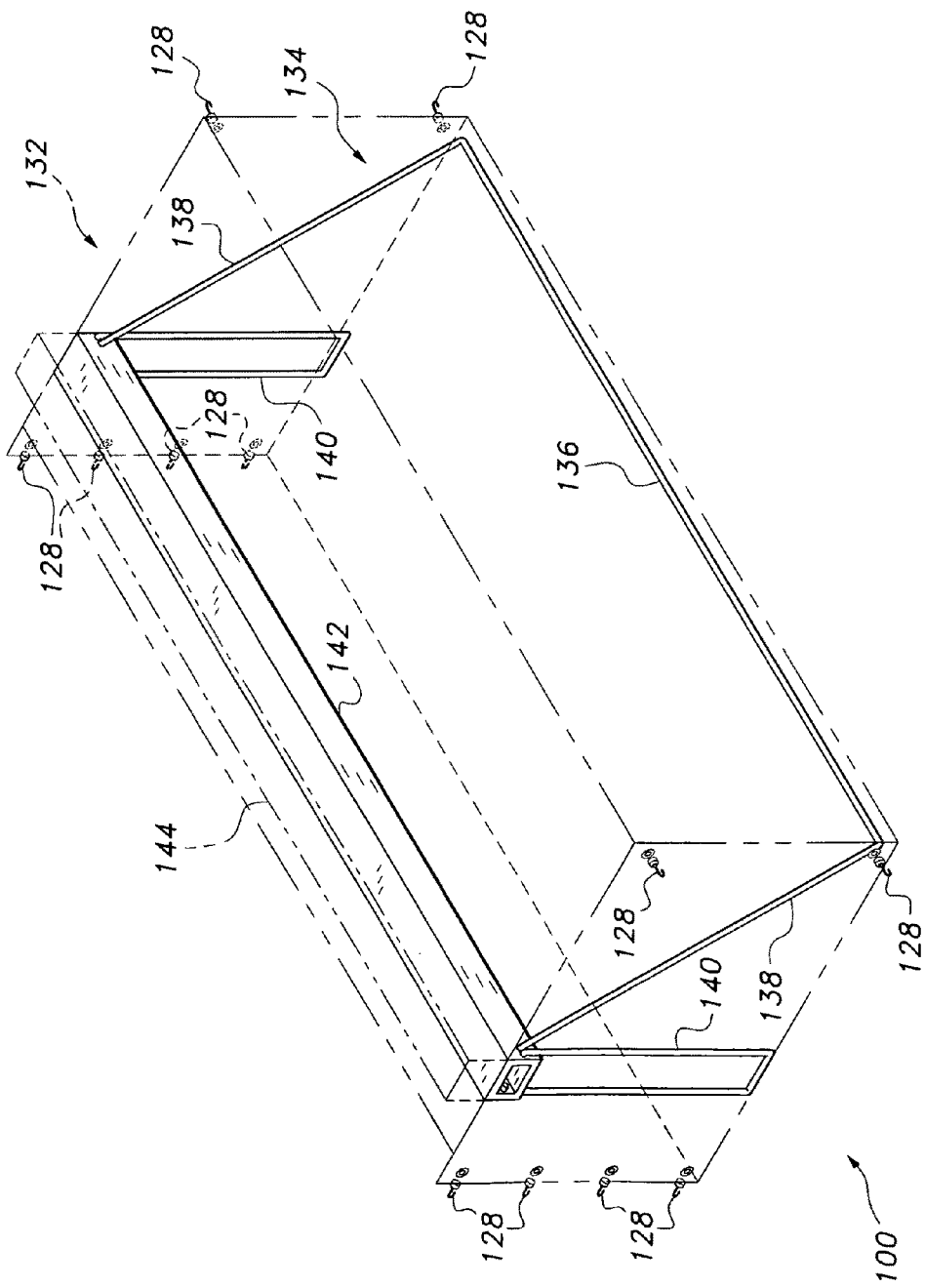
FIG. 7 is a perspective view of another alternative embodiment of a removable enclosure for the rear of a vehicle according to the present invention.

FIG. 7 illustrates a frame 134 of an alternative enclosure 100 for supporting a housing 132. Frame 134 includes a laterally extending upper frame member 142 and a pair of pivoting side frame members 140 projecting downwardly from either end. Pivoting side frame members 140 are pivotally secured at their upper ends to the upper frame member 142. Preferably, the side frame members 140 are received within sleeves or the like associated with cover 132. When the cover 132 is opened, the side frame members 140 may be swung into place as they are received within the sleeves. The diagonal supports 38 of the frame of FIG. 3 are replaced by rods 138, and at least one elastic cord 136 extends therebetween, as shown.

A laterally extending, resilient member 144, formed from foam or the like, may be mounted on the front, upper frame member 142. The pivoting side frame members 140 allow for easy collapse of the frame 134 (and of the entire enclosure 100) for storage or transport. Additionally, the upper frame member 142 may be centrally hinged, allowing for additional collapse of frame 134. Alternatively, the upper frame member 142 may be telescoping, formed from two separate members, with one sliding within the other, thus allowing for selective reduction and control over the length of member 142.

Figure 14:
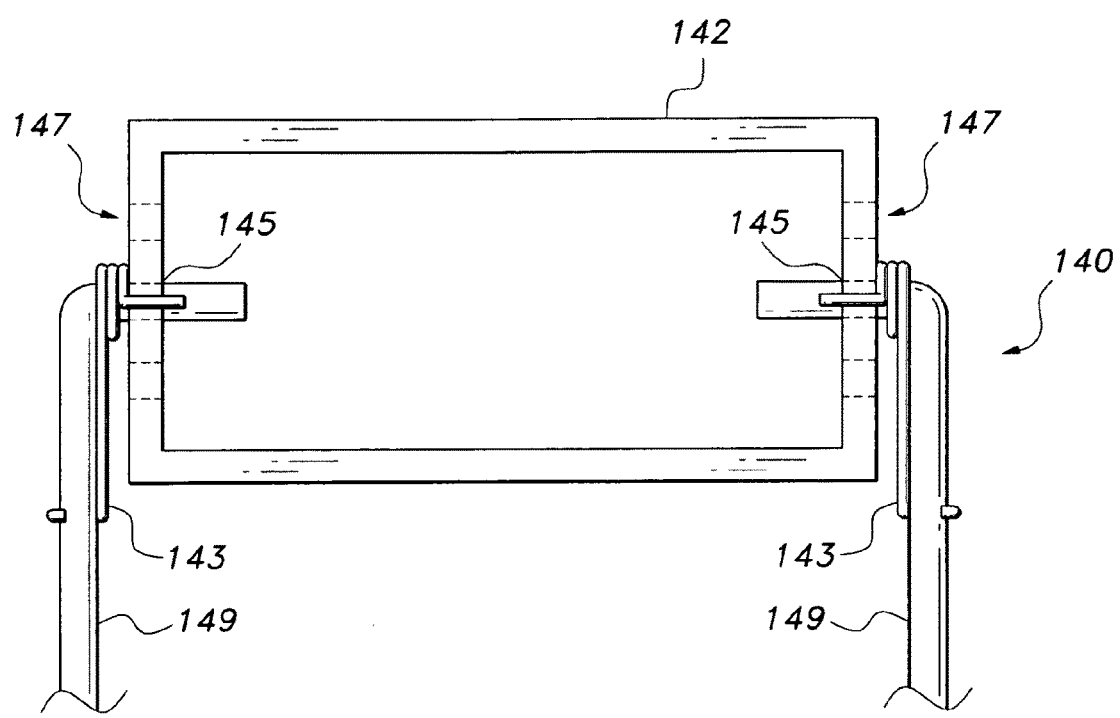
FIG. 14 is a partial side view of a portion of the frame for the removable enclosure of FIG. 7, showing details of the side frame members.

As best shown in FIG. 14, each side frame member 140 includes a pair of vertical struts 149 (forming the legs of the substantially U-shaped member 140). The upper ends of the struts 149 are inserted through opposed openings formed through the upper frame member 142. Preferably, at least two sets of openings 145, 147 are provided, allowing for vertical height adjustment of the side frame members 140 with respect to the upper frame member 142. As shown, the side frame members 140 may be spring-biased with respect to the upper frame member 142 by helical torsion springs 143 or the like. The springs 143 bias the struts 149 downward at a 90° angle to the upper frame member 142, aiding in quick setup of the enclosure 100 and attachment to the truck.

A similar resilient member may also be mounted on the frame of FIG. 3. This allows a front, upper portion 26 (shown in FIG. 2) of the housing to be angled upwardly to form a substantially triangular shape. When applied to the open tailgate T of a pickup truck, the housing may be used with the cover C of the pickup truck's bed in place, the front end of the housing being disposed between the laterally opposed walls defining the bed and with the upper edge of the triangular portion 26 of the upper wall 16 of the housing contacting a lower surface of the cover C, thus providing a seal therebetween (this positioning is shown in FIG. 1). This seal prevents snow, rain, wind or the like from blowing within the enclosed area. Additionally, any water will flow downwardly and outwardly due to the sloped contour of this portion. As noted above, the enclosure may be adjusted to have a substantially triangular configuration, rather than rectangular, which will also allow water to flow downwardly and outwardly. It should be understood that the resilient member 144 may be removable and may be retained on member 142 by any suitable type of fastener, such as hook and loop fasteners or the like.

Any suitable type of releasable fastener may be used to secure the open front end 20 and the open lower end of the housing to the open rear end of the vehicle. For example, at least one pair of hook members 28 may be attached to laterally opposed ends of the at least one elastic cord 36. At least one pair of brackets 30 are mounted within the rear end of the vehicle for releasably engaging the at least one pair of hook members 28 and releasably securing the housing to the rear end of the vehicle. It should be understood that brackets 30 may be mounted in any desired location with respect to the open tailgate. Although shown in FIG. 2 as being adjacent the open end of the truck bed, brackets 30 may be positioned approximately ten inches in from the open end, for example. In the embodiment of FIG. 7, hook members 128 are similarly provided. It should be noted that front sets of hook members 128 are preferably arrayed along the front, vertical edges of housing 132, as shown. This arrangement (with corresponding brackets in the vehicle) is particularly useful for connection to the interior of a sports utility vehicle (SUV) or the like.

Figure 13A:
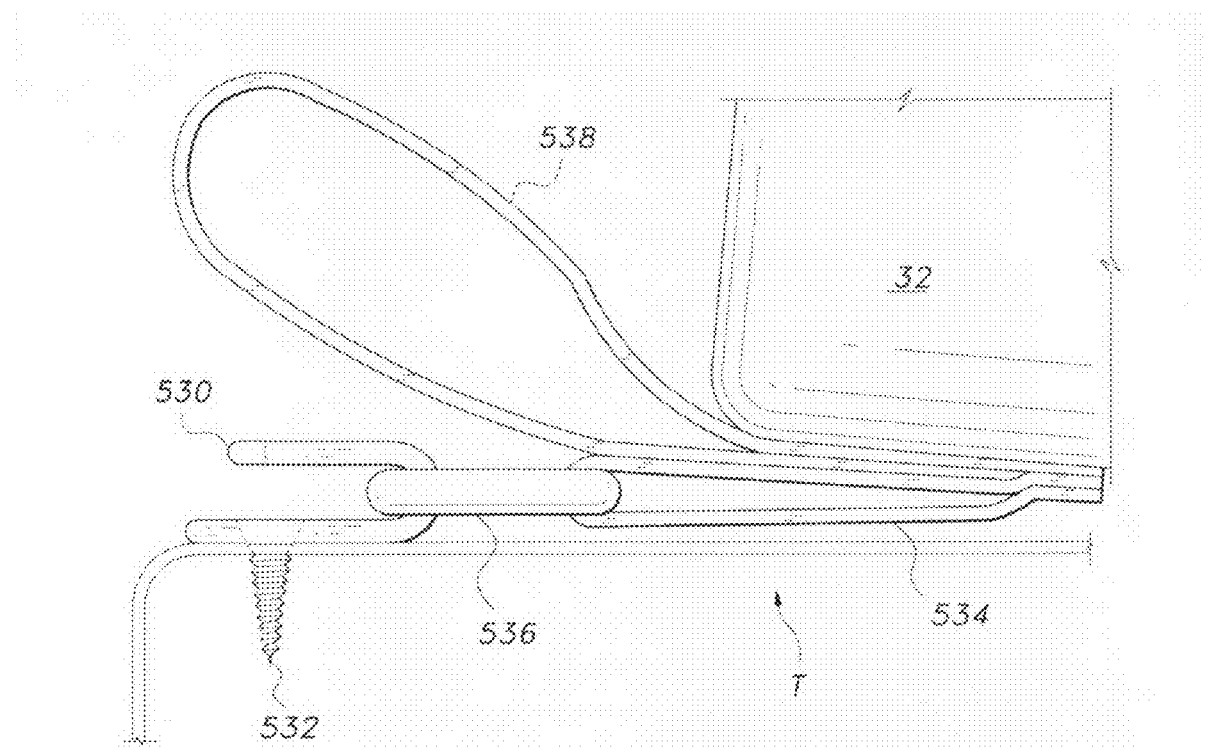
FIG. 13A is a partial, side view of the removable enclosure for the rear of a vehicle according to the present invention, showing an alternative fastener therefor.
Figure 13B:
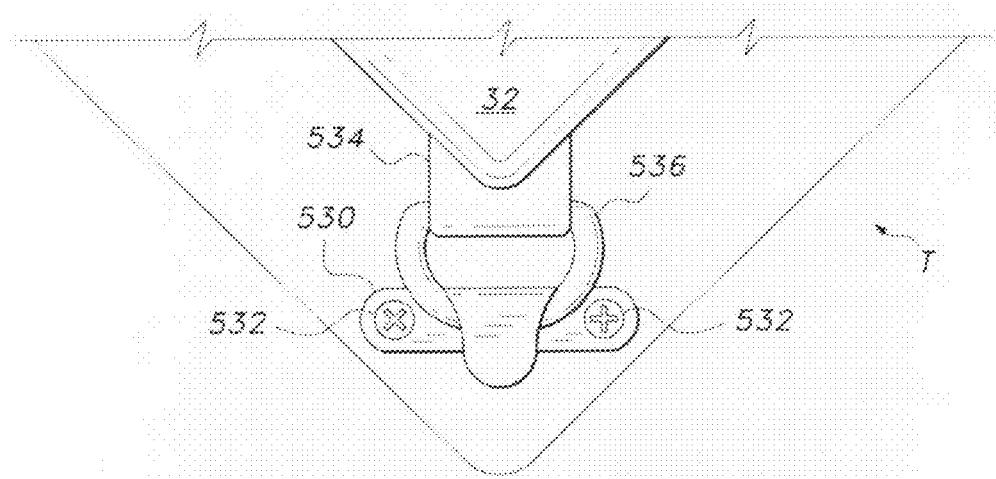
FIG. 13B is a partial top view of the alternative fastener of FIG. 13A.

FIGS. 13A and 13B illustrate an alternative mounting structure to the brackets 30 of FIG. 2. As shown, substantially U-shaped brackets 530 may be mounted directly on the open tailgate T via screws 532 or other fasteners. D-rings 536 are attached to the exterior of the housing 32 by straps 534 or the like. The D-rings 536 are releasably hooked to the U-shaped brackets 530. In FIG. 13A, a looped handle 538 is shown extending from the exterior of the housing 32 adjacent to the corresponding strap 534, allowing the user to easily disengage the D-ring 536 from the bracket 530. The looped handle 538 has been removed in FIG. 13B for purposes of clarity.

Figure 4:
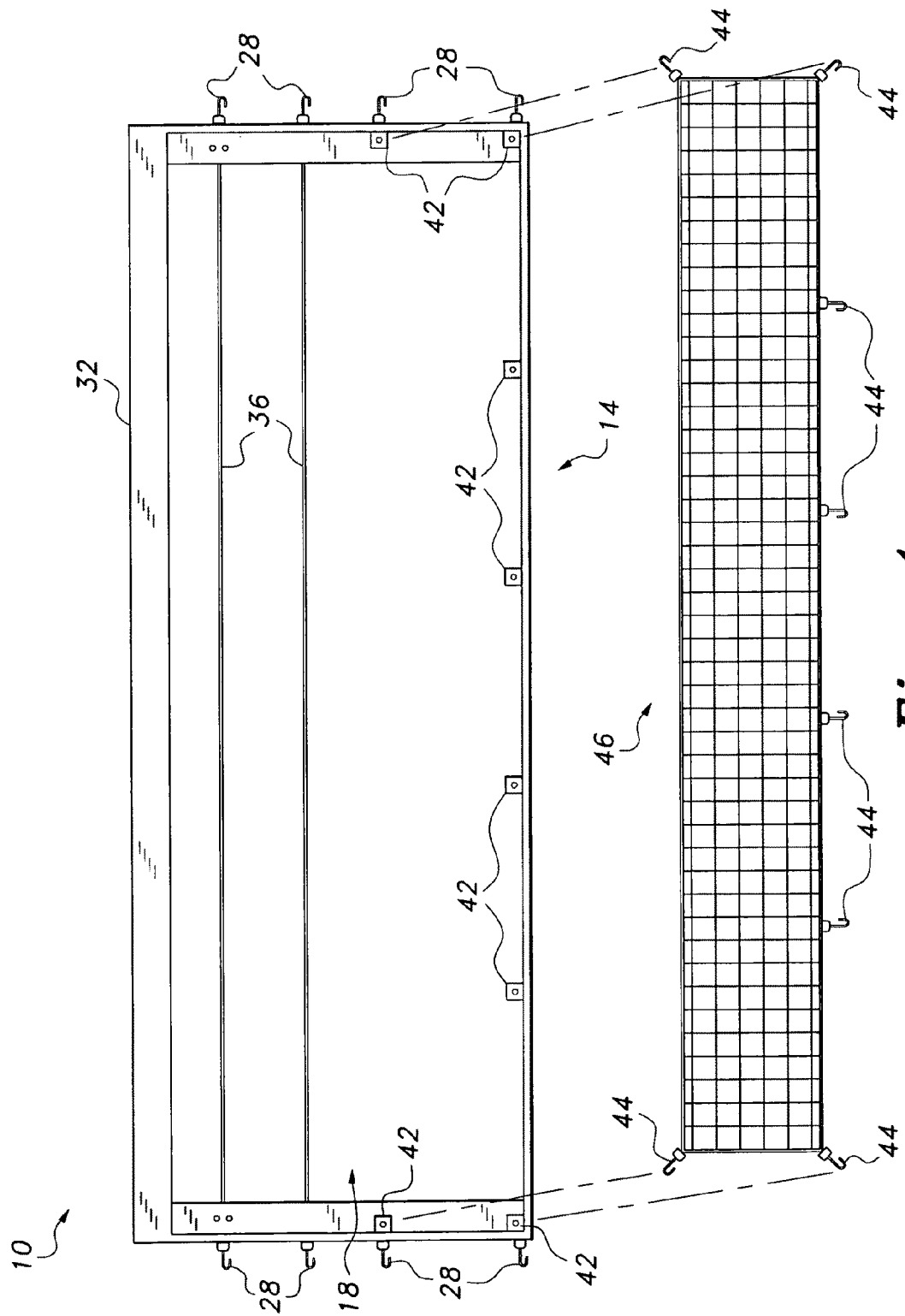
FIG. 4 is a front view of an alternative embodiment of a removable enclosure for the rear of a vehicle.
Figure 5:
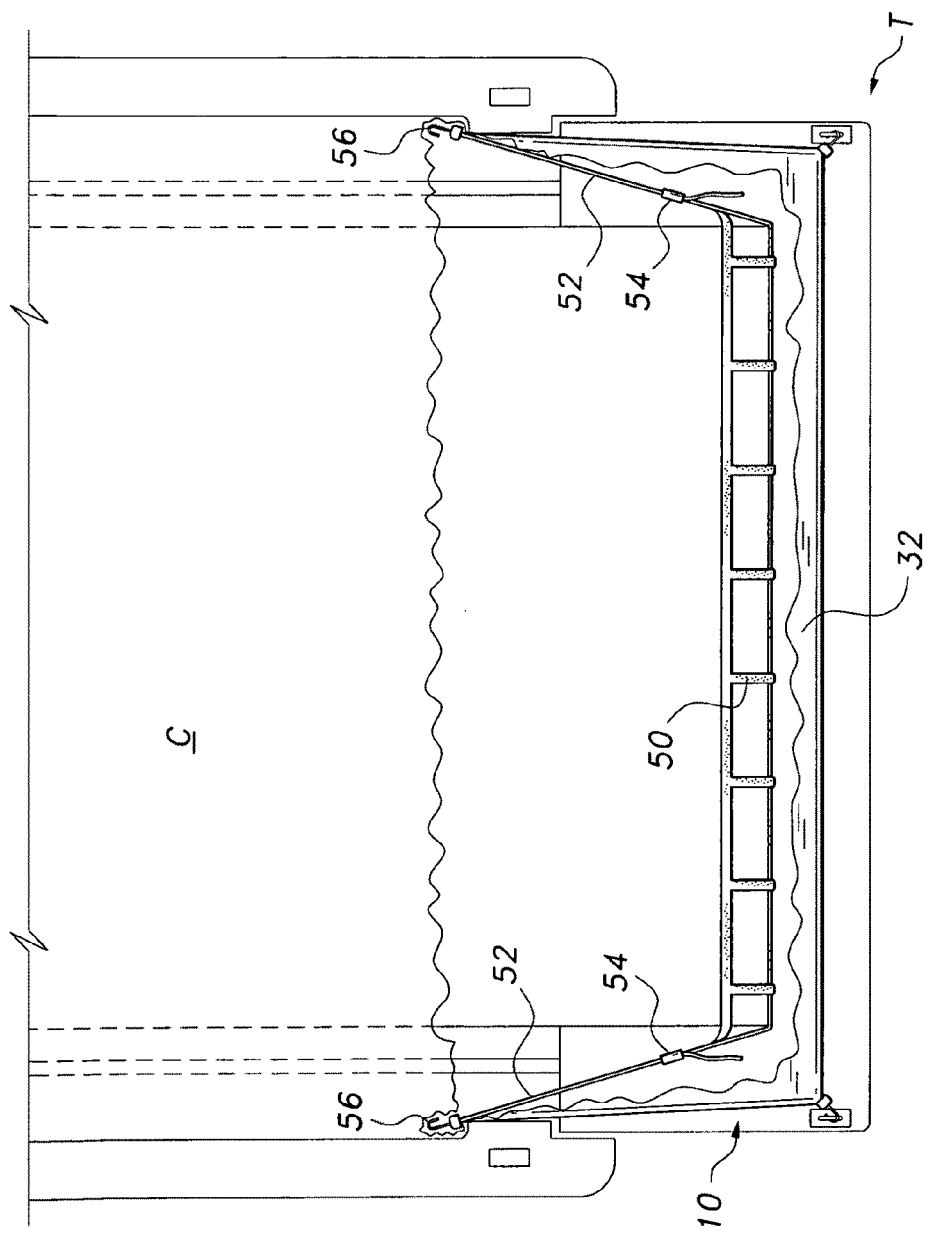
FIG. 5 is a top view of another alternative embodiment of a removable enclosure for the rear of a vehicle.
Figure 15:
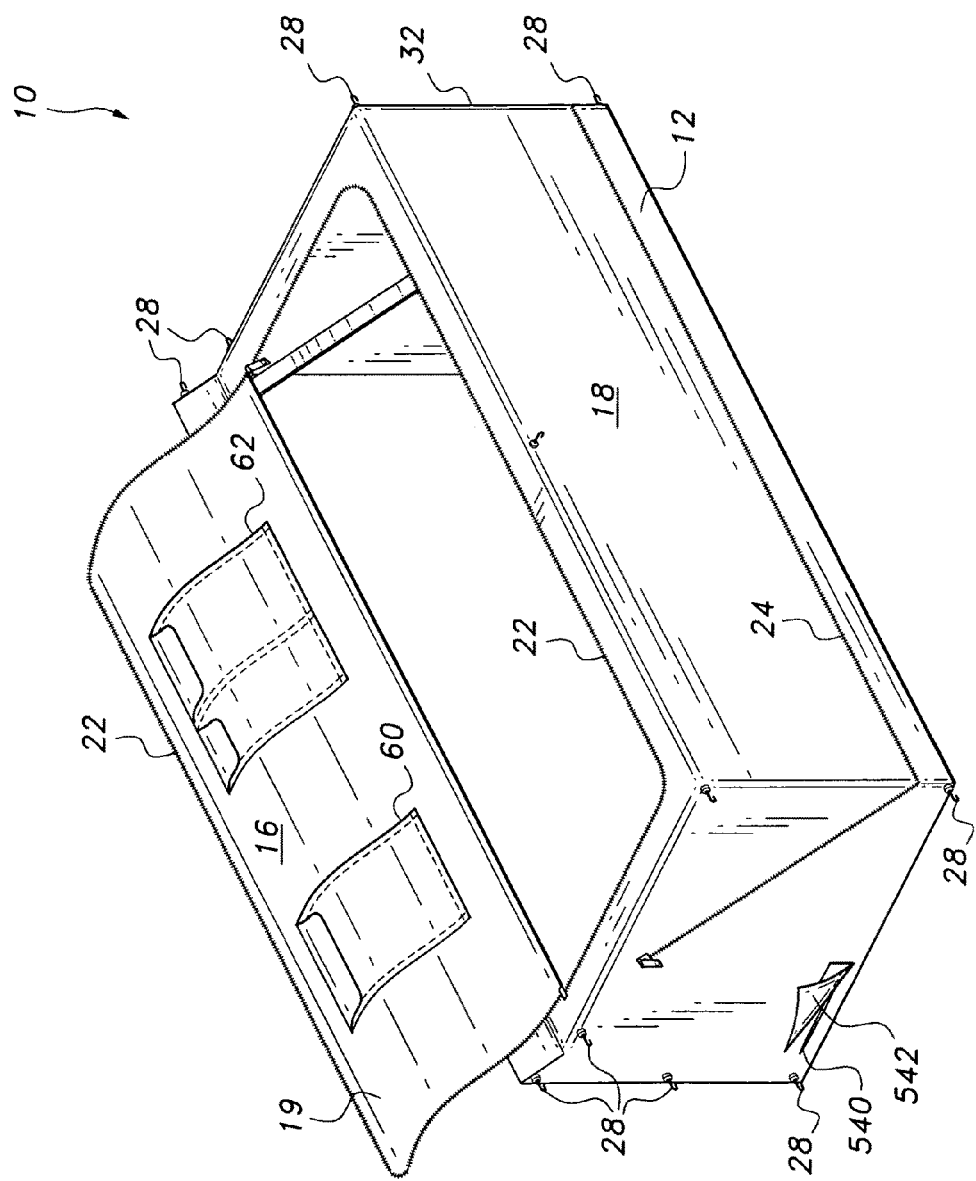
FIG. 15 is a perspective view of the removable enclosure of FIG. 6, showing an optional slot for facilitating attachment of the enclosure to the vehicle.

Additional elements and accessories may be provided for use with the enclosure 10. In the alternative embodiment of FIG. 4, a plurality of tabs 42 have been secured to the front end of the housing. A laterally extending retainer member 46 may be releasably attached to the open front end 20 to at least partially cover the front end 20. Preferably, retainer member 46 fully covers the front end 20, extending fully from top to bottom of the front end 20, allowing retainer member 46 to be effectively used with a pet carrier for retaining pets within the enclosure. The retainer member 46 is preferably provided with a plurality of hook members 44, as shown, for engaging the tabs 42. It should be understood that any suitable type of releasable fasteners may be utilized. As an alternative, hook members 44 may be used in combination with brackets 30 of FIG. 2, rather than tabs 42. Similarly, a cargo retainer 50 may be added, as shown in FIG. 5, the cargo retainer 50 being formed from mesh or the like and having a pair of laterally extending straps 52. Each strap 52 terminates in a hook member 56 for engaging a bracket mounted within the vehicle. Additional strap binders 54, buckles or the like may also be utilized. Preferably, when using the retainer 50, a slot 540 is formed through the housing 32, as shown in FIG. 15. The retainer 50, in use, passes through this slot for attachment to the truck's cargo eye. A flap 542 may be provided for covering the slot 540, and may be held in place via hook and loop fasteners or any other suitable type of fastener.

Figure 8:
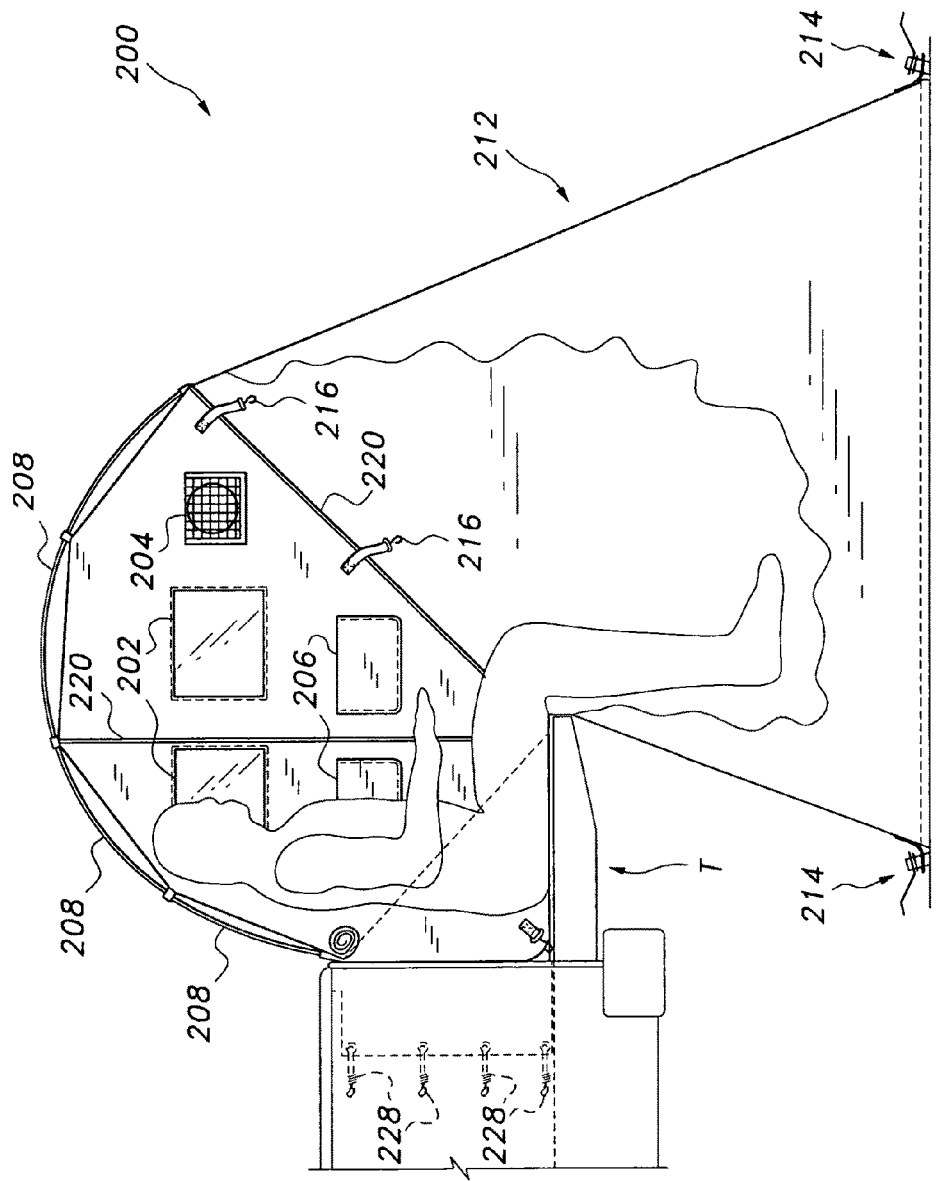
FIG. 8 is a side view of yet another alternative embodiment of a removable enclosure for the rear of a vehicle according to the present invention, shown broken away to show details thereof.
Figure 9:
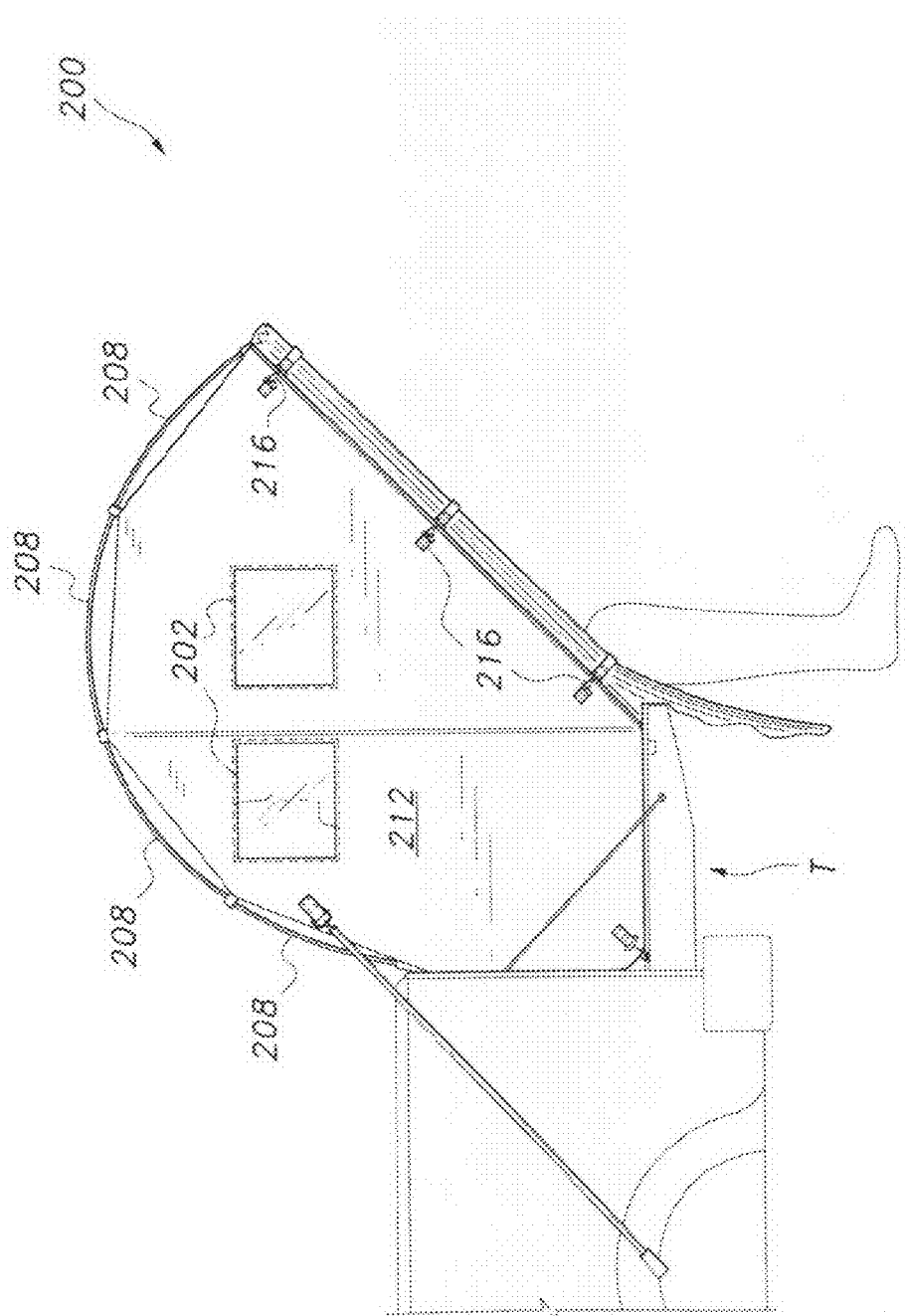
FIG. 9 is a side view of the removable enclosure of FIG. 8, shown configured as a partial shelter.

In the embodiment of FIGS. 8 and 9, the substantially rectangular enclosures 10 and 100 have been replaced by a tent enclosure 200 adapted for housing a person therein. The housing 212 is sized and configured substantially similar to a conventional one-person tent. A front edge of the housing 212 has a plurality of hook members 228 mounted thereon (arrayed similarly to those shown in the embodiment of FIG. 7) for releasable engagement with corresponding brackets mounted within the vehicle. One or more external frame supports 208 and an internal frame support 220, which is pivotally secured to the rear end of the vehicle (tailgate T in the example of FIGS. 8 and 9), provide a framework for the structure. The supports 208, 220 may be fiberglass rods or the like.

Figure 11:
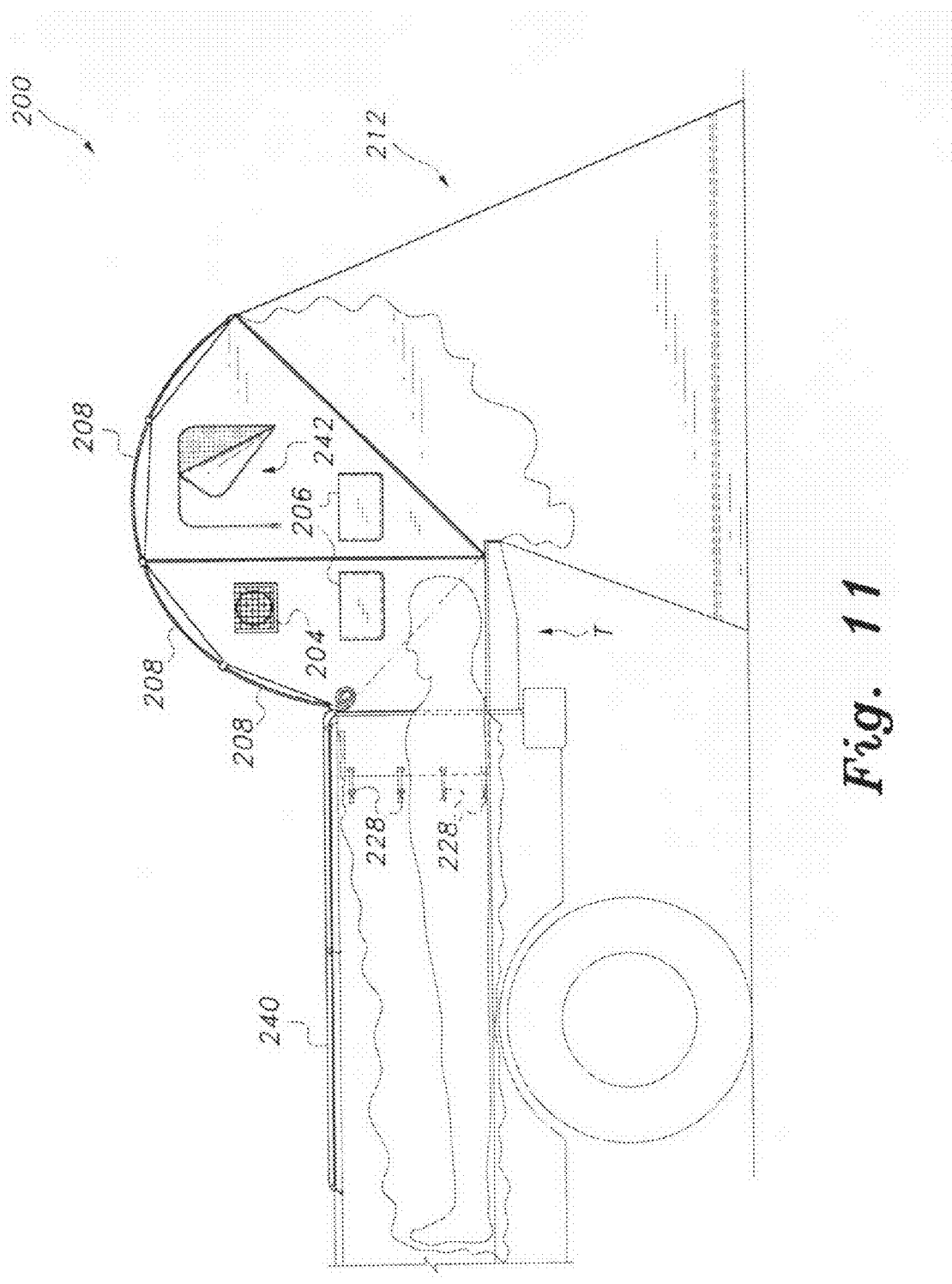
FIG. 11 is a side view of yet another alternative embodiment of a removable enclosure for the rear of a vehicle according to the present invention, shown broken away to show details thereof.

Tent pegs 214 (or any other type of stake, such as ice anchors, are provided for securing a lower end of the housing 212 to the ground. Additionally, a storage pocket 206, a window 202 flap or the like, and a vent 204 may be provided. FIG. 9 illustrates the lower portion of housing 212 raised and connected to the diagonal support 220, with the lower end of housing 212 being held in place by straps 216. It should be understood that any suitable type of releasable fastener may be utilized. FIG. 11 illustrates tent enclosure 200 with an additional extending portion 240, formed from reflective material, so that the user may lie in the orientation shown with thermal solar radiation being reflected away. Preferably, the reflective portion 240 is removable, allowing the reflective covering to be used in any desired location, or with any desired configuration, such as being added to the pet enclosure of FIG. 12. FIG. 11 illustrates alternative positioning of the pocket 204 and the vent 204. An additional flap 242 has also been added.

Figure 12:
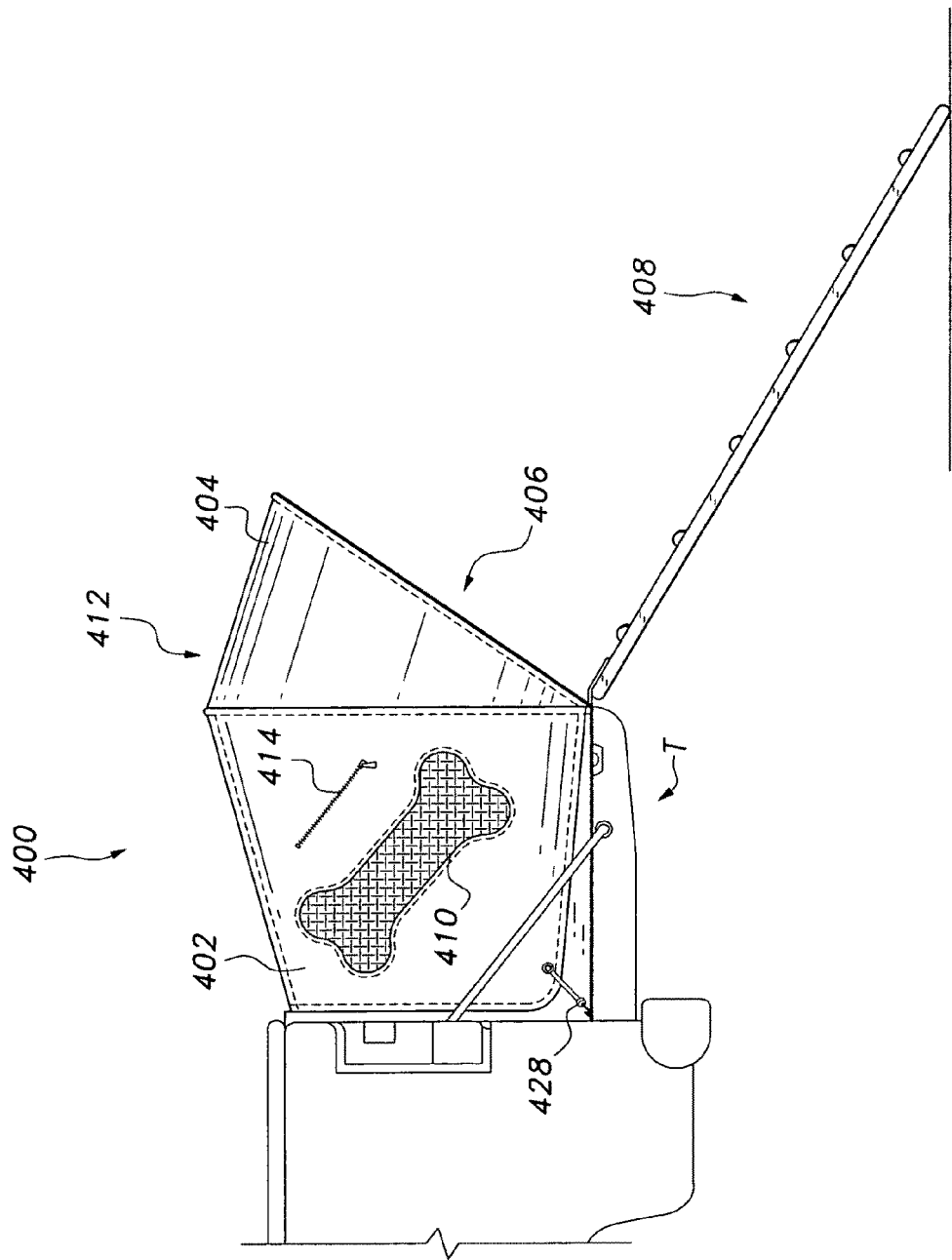
FIG. 12 is a side view of another alternative embodiment of a removable enclosure for the rear of a vehicle according to the present invention.

FIG. 12 illustrates an alternative enclosure 400, similar to that shown in FIGS. 8, 9 and 11, but with a housing 412 being sized and configured for use by dogs or other pets. An overhanging portion 404 has been added, with the rear portion 406 of the enclosure being open. A ramp 408 is provided for pivotal connection to the open tailgate T, as shown, allowing the pet to easily enter and exit the open rear end 406. Vents 410, 414 may be formed through sidewalls 402, as shown, and hook members 428 engage brackets mounted within the vehicle, in a manner similar to those described with relation to previous embodiments. As noted above, retainer member 46 may be used to form the forward end of the pet enclosure in this embodiment.

Figure 10:
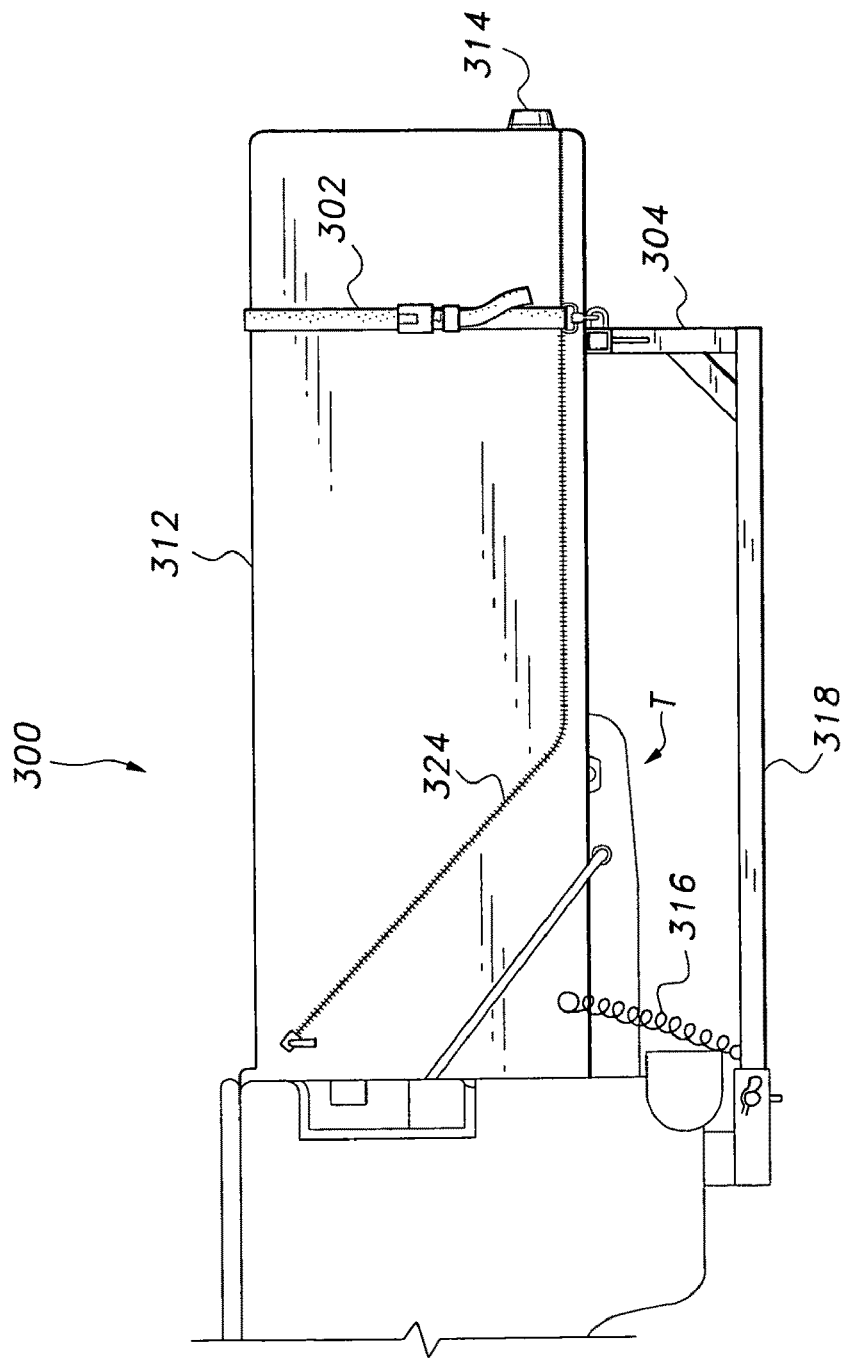
FIG. 10 is a side view of another alternative embodiment of a removable enclosure for the rear of a vehicle according to the present invention.

In the alternative embodiment of FIG. 10, the enclosure 300 is similar to the enclosure 10, but with a longer housing 312. As shown, the housing 312 is adapted for covering long loads, such as lumber or the like. Since housing 312 extends beyond tailgate T, a support 318 is provided. One end of the support 318 is attached to the rear end of the vehicle (beneath the truck bed, e.g., to a tow hitch), and the other end has a vertical support 304 mounted thereon for supporting the rear end of housing 312. A slit 324 may be formed in housing 312, similar to that described above with reference to enclosure 10, and a set of taillights 314 may be secured to the rear face of the housing 312. Power and control of taillights 314 is accomplished in a manner similar to that of a conventional extension trailer, the power and control signals being provided through a cable 316.

It is to be understood that the present invention is not limited to the embodiments described above, but encompasses any and all embodiments within the scope of the following claims.

I claim:

1. A removable enclosure for the rear of a vehicle, comprising:
   a housing having at least one sidewall and an upper wall defining an open lower end and an open front end;
   an internal frame disposed within and supporting the housing, the internal frame including at least one elastic cord extending laterally across the housing, the cord being secured to an inner surface of the housing, and a pair of laterally opposed diagonal supports, each of the diagonal supports extending from an upper edge of the front end of the housing to a lower edge of a rear face of the at least one sidewall of the housing, the at least to one elastic cord being secured to, and extending between, the pair of laterally opposed diagonal supports; and
   means for releasably securing the front end and the lower end of the housing to an open rear end of a vehicle.

2. The removable enclosure for the rear of a vehicle as recited in claim 1, wherein the means for releasably securing the front end and the lower end of said housing to the open rear end of the vehicle comprises:
   at least one pair of hook members respectively secured to laterally opposed ends of the at least one elastic cord; and
   at least one pair of brackets adapted for mounting within the rear end of the vehicle for releasably engaging the at least one pair of hook members.

3. The removable enclosure for the rear of a vehicle as recited in claim 2, further comprising a laterally extending, resilient member mounted on a front, upper portion of said internal frame.

4. The removable enclosure for the rear of a vehicle as recited in claim 3, wherein a front, upper portion of said housing is angled upwardly and is substantially triangular.

5. The removable enclosure for the rear of a vehicle as recited in claim 2, further comprising a flap formed in the upper wall of said housing.

6. The removable enclosure for the rear of a vehicle as recited in claim 5, further comprising means for releasably sealing the flap.

7. The removable enclosure for the rear of a vehicle as recited in claim 6, wherein said means for releasably sealing the flap comprises a zipper.

8. The removable enclosure for the rear of a vehicle as recited in claim 7, further comprising at least one pocket disposed on an inner face of the flap.

9. The removable enclosure for the rear of a vehicle as recited in claim 8, further comprising a slit formed through the at least one sidewall of said housing.

10. The removable enclosure for the rear of a vehicle as recited in claim 9, further comprising means for releasably sealing the slit.

11. The removable enclosure for the rear of a vehicle as recited in claim 10, wherein said means for releasably sealing the slit comprises a zipper.

12. The removable enclosure for the rear of a vehicle as recited in claim 11, further comprising a laterally extending retainer member releasably attached to the open front end of said housing and at least partially covering the open front end.

13. A removable enclosure for the rear of a vehicle, comprising:
- a housing having at least one sidewall and an upper wall defining an open lower end and an open front end, the upper wall having a portion forming a flap in the upper wall;
- an internal frame disposed within and supporting the housing, the internal frame including at least one elastic cord extending laterally across the housing, the cord being secured to an inner surface of the housing, and a pair of laterally opposed diagonal supports, each of the diagonal supports extending from an upper edge of the front end of the housing to a lower edge of a rear face of the at least one sidewall of the housing, the at least one elastic cord being secured to, and extending between, the pair of laterally opposed diagonal supports;
- at least one pair of hook members respectively secured to laterally opposed ends of the at least one elastic cord; and
- at least one pair of brackets adapted for being mounted within the rear end of the vehicle for releasably engaging the at least one pair of hook members and releasably securing the housing to the rear end of the vehicle.

14. The removable enclosure for the rear of a vehicle as recited in claim 13, further comprising a laterally extending, resilient member mounted on a front, upper portion of said internal frame.

15. The removable enclosure for the rear of a vehicle as recited in claim 14, wherein a front, upper portion of said housing is angled upwardly and is substantially triangular.

16. The removable enclosure for the rear of a vehicle as recited in claim 15, further comprising means for releasably sealing the flap.

17. The removable enclosure for the rear of a vehicle as recited in claim 16, further comprising at least one pocket disposed on an inner face of the flap.

18. The removable enclosure for the rear of a vehicle as recited in claim 17, further comprising a slit formed through the at least one sidewall of said housing.

19. The removable enclosure for the rear of a vehicle as recited in claim 18, further comprising means for releasably sealing the slit.

20. The removable enclosure for the rear of a vehicle as recited in claim 19, wherein said means for releasably sealing the slit and said means for releasably sealing the flap comprise zippers.

* * * * *